(12) United States Patent
Ficchi et al.

(10) Patent No.: US 12,472,997 B2
(45) Date of Patent: Nov. 18, 2025

(54) TOW HITCH ASSEMBLY FOR WHEELED VEHICLES

(71) Applicants: Vincent E. Ficchi, Utica, NY (US); Andrew C. Clarey, Clinton, NY (US)

(72) Inventors: Vincent E. Ficchi, Utica, NY (US); Andrew C. Clarey, Clinton, NY (US)

( * ) Notice: Subject to any disclaimer, the term of this patent is extended or adjusted under 35 U.S.C. 154(b) by 561 days.

(21) Appl. No.: 17/984,971

(22) Filed: Nov. 10, 2022

(65) Prior Publication Data
US 2024/0157985 A1    May 16, 2024

(51) Int. Cl.
B61G 1/28    (2006.01)

(52) U.S. Cl.
CPC ..................... B61G 1/28 (2013.01)

(58) Field of Classification Search
CPC ........ B60D 2001/544; B60D 2001/546; B60D 1/54; B60D 1/56; B60D 1/075; B60D 1/07; B61G 1/36; B61G 1/00; B61G 1/28
See application file for complete search history.

(56) References Cited

U.S. PATENT DOCUMENTS

| | | | | |
|---|---|---|---|---|
| 274,180 A * | 3/1883 | DeCew | ............... | B61G 1/28 213/188 |
| 290,005 A * | 12/1883 | Dougherty | ............... | B61G 1/28 213/197 |
| 4,275,899 A * | 6/1981 | Humphrey | ............... | B60D 1/07 280/497 |
| 4,915,276 A * | 4/1990 | Devito | ............... | B60R 9/06 224/500 |
| 5,709,274 A * | 1/1998 | Herbold | ............... | B60D 1/07 280/416.2 |
| 5,915,714 A * | 6/1999 | Bell | ............... | B60D 1/248 280/416.1 |
| 6,042,137 A * | 3/2000 | McIntosh | ............... | B60D 1/46 280/490.1 |
| 6,213,492 B1 * | 4/2001 | Ceccarelli, III | ......... | B60D 1/07 280/901 |
| 7,717,454 B2 * | 5/2010 | Lair | ............... | B60D 1/07 280/495 |
| 7,815,210 B1 * | 10/2010 | Pennal | ............... | B60D 1/56 280/491.5 |

(Continued)

FOREIGN PATENT DOCUMENTS

| | | | | |
|---|---|---|---|---|
| CN | 116788188 A * | 9/2023 | ............. | B60R 19/48 |
| JP | H0723604 U * | 5/1995 | | |
| WO | WO-0234575 A1 * | 5/2002 | ............... | B60D 1/58 |

*Primary Examiner* — Paul N Dickson
*Assistant Examiner* — Maxwell L Meshaka
(74) *Attorney, Agent, or Firm* — Barclay Damon LLP (57) ABSTRACT

A tow hitch assembly for interconnecting two or more wheeled vehicles, such as railbikes, each vehicle having a frame, a front bumper and a rear bumper. The tow hitch assembly includes a linking member and a pair of cross members centrally and transversely attached to opposing ends of the linking member. Each cross member has a top wall, a front wall and a rear wall defining an open-ended lower channel configured to be fitted directly over one of the front and rear bumpers of one of the two or more wheeled vehicles. The linking member includes opposing end openings configured to engage a projecting pin of a corresponding cross member. Using a plurality of tow hitch assemblies, a plurality of wheeled vehicles can be moved between locations.

10 Claims, 6 Drawing Sheets

(56) References Cited

U.S. PATENT DOCUMENTS

| | | | |
|---|---|---|---|
| 8,690,181 B1* | 4/2014 | Roeber | B60D 1/145 |
| | | | 280/491.1 |
| 10,632,802 B1* | 4/2020 | Bertalon | B60D 1/363 |
| 2006/0091641 A1* | 5/2006 | Aquinto | B60D 1/56 |
| | | | 280/500 |
| 2006/0201980 A1* | 9/2006 | Koons | B60D 1/58 |
| | | | 254/323 |
| 2008/0111347 A1* | 5/2008 | Tunno | B60D 1/52 |
| | | | 280/504 |
| 2008/0284133 A1* | 11/2008 | Lair | B60D 1/52 |
| | | | 280/455.1 |
| 2020/0283079 A1* | 9/2020 | McCoy | B62D 53/08 |
| 2024/0157985 A1* | 5/2024 | Ficchi | B61G 1/28 |

* cited by examiner

TOW HITCH ASSEMBLY FOR WHEELED VEHICLES

TECHNICAL FIELD

The application is generally directed to the field of wheeled vehicles and more specifically to a tow hitch assembly used for towing or otherwise transporting one or preferably more wheeled vehicles, such as railbikes.

STATE OF THE ART

Railbikes are human-powered wheeled vehicles that have evolved to become a trendy and popular form of exercise and entertainment in many locations in the United States and around the world. A railbike is typically defined by a frame having two or more seats that is supported by front and rear rail wheels sized and configured to ride onto a set of train rails. The railbike is powered by a set of pedals, typically connected to a chain drive and transmission or similar mechanism, as well as a braking mechanism such as a braking lever. Some railbikes may be equipped with an electric or other backup motor that can provide additional power to drive the railbike, if needed for example, if the human operator(s) are tired. Otherwise, the railbike can be powered by some or all of the seated individuals pedaling the railbike.

In typical settings, a plurality of railbikes are used for tours or excursions involving groups of individuals. To facilitate this, there is a need in the field to be able to move a plurality of railbikes all at one time.

BRIEF DESCRIPTION

Therefore and according to one aspect of the present invention, there is provided a tow hitch assembly for interconnecting two or more wheeled vehicles, such as railbikes, each wheeled vehicle having a frame including a front bumper and a rear bumper, the tow hitch assembly comprising:

a pair of cross members centrally and transversely attached to opposing ends of the linking member and couplable to the front and rear bumpers of adjacent railbikes, each cross member including an open-ended channel that is configured to be fitted directly over one of the front and rear bumpers of one of the two or more vehicles; and a linking member disposed between and coupling the pair of cross members.

According to at least one version, the linking member includes a pair of opposed end openings that are sized and configured for engaging the cross members. In at least one embodiment, the cross members each include a projecting pin over which the end openings of the linking member can be positioned, the projecting pin preferably being disposed vertically at about the center of the length dimension of the cross member.

The cross members can also include extensions or ears at ends thereof that are configured to engage other portions of the vehicle frame. According to at least one version, the cross members can further include a plurality of openings that permit the cross members to be securely attached to the frame of the railbike, or other wheeled vehicle.

According to another aspect of the invention, there is provided a method for towing two or more wheeled vehicles using a tow hitch assembly, the method comprising:

attaching a first cross member over one of the front and rear bumpers of one of the two or more wheeled vehicles;

attaching a second cross member over the other of the front and rear bumpers of an adjacent vehicle; and securing the cross members using a linking member to the bumper and the frame of each wheeled vehicle.

In at least one version, the method further comprises positioning end openings of the linking member over projecting pins formed on each of the first and second cross members. Preferably, each projecting pin is vertically disposed at about the center of the length dimension of each cross member.

According to at least one embodiment, the method further comprises securing extensions or ears of each of the first and second cross members to axial frame members of each wheeled vehicle. In addition, the method can further comprise securing the cross members by attaching fasteners to openings provided in the cross member and the frame of the railbike, or other wheeled vehicle.

Advantageously, a number of railbikes or other wheeled vehicles can be pulled or otherwise transported between locations at one time. For example, a convoy of multiple railbikes can be linked to one another in serial fashion using a plurality of the tow hitch assemblies. In at least one version, a front or a rear railbike can include a motor to push or pull the convoy of railbikes between locations.

The tow hitch assembly is easy to fabricate, easy to use, is reliable and does not interfere with the overall design or functionality of the railbike.

These and other features and advantages will be readily apparent from the following Detailed Description, which should be read in conjunction with the accompanying drawings.

DETAILED DESCRIPTION

The following generally describes a tow hitch assembly in accordance with an exemplary embodiment that is configured for interconnecting two or more railbikes for purposes of transporting the railbikes between locations. It will be understood that the herein described tow hitch assembly can also be similarly used in connection with other wheeled vehicles, not limited to golf carts, go carts, and the like. In addition and throughout the course of discussion, a number of terms are used for providing an adequate frame of reference with regard to the accompanying drawings. These terms which include "front", "rear", "above", "below", "distal", "proximal", "top", "bottom" and the like are not intended to narrow the overall scope of the invention, except where so specifically indicated.

The accompanying drawings are intended to convey salient features of the present invention and are not necessarily to scale. Accordingly, the reader should not rely on the drawings for scaling purposes.

An embodiment of the tow hitch assembly is shown in connection with a typical railbike 10. The railbike 10 is defined by a unitary chassis or frame 14 made from a structural material such as steel. The frame 14 according to this embodiment includes a pair of lateral or axial frame members 17 in spaced parallel relation. A predetermined number of seats 19 are individually supported by an upper portion of the frame 14. Railbikes typically include 2 seats or 4 seats or more. For example, customized versions can include literally any number of seats. In the depicted version, the railbike 10 includes four (4) seats 19 disposed in two parallel rows of two seats each, with the seats 19 in each row being supported by a corresponding lateral frame member 17.

A pair of front rail wheels 20 and a pair of rear rail wheels 24 are connected by front and rear axles 28 that are coupled to a lower portion of the frame 14. A wheel drive mechanism is provided in the form of pedals 36 having a chain drive 40, FIG. 5, linked to the rail wheels 20, 24 through a transmission 44 (partially shown) or similar other drive means capable of propelling the railbike 10. Suitable drive and braking mechanisms are described in greater detail, for example, in U.S. Patent Application Publication No. 2009/0038502 A1, which is incorporated herein by reference in its entirety. Preferably, a set of pedals 36 is provided for all seated passengers of the railbike 10. Accordingly and in this version, four (4) sets of pedals 36 are provided for powering the railbike 10.

The front and rear wheels 20, 24 are made from a very durable material such as metal or may alternatively be made from urethane, delrin or other suitable material, with the rail wheels being configured with features that resemble wheel rims that are each sized to engage or ride upon a set of train rails or tracks (not shown). The railbike 10 further includes bumpers 48, 52 at the front and rear end of the frame 14, each of which are welded or otherwise secured to the lateral frame members 17. As shown, a tow hitch assembly 100 made in accordance with the exemplary embodiment is attached to the front end and more specifically the front bumper 48 and frame 14 of the railbike 10. The tow hitch assembly 100 will now be described in greater detail.

With reference to FIGS. 1-5, the tow hitch assembly 100 according to this exemplary embodiment is defined by a pair of elongate cross bars or cross members 104, each of which is made from a structural material, such as stainless steel. According to this embodiment, 8 gauge stainless steel is used. More specifically, each cross bar 104 is defined by a unitary component having a top wall 108, a front wall 112 and a rear wall 116, as well as an open U-shaped lower channel 120 extending completely along the length dimension of the cross bar 104. As shown in FIGS. 2(a) and 2(b), the lower channel 120 is shaped and sized to permit placement over either the front or rear bumper 48, 52 of the railbike 10. The cross bar 104 according to this specific embodiment further includes extensions or ears 130 formed at each end of the cross bar 104, each ear 130 being sized for engagement with a lateral frame member 17 of the railbike 10, such as bolts that can optionally be threaded.

Figure 2A:
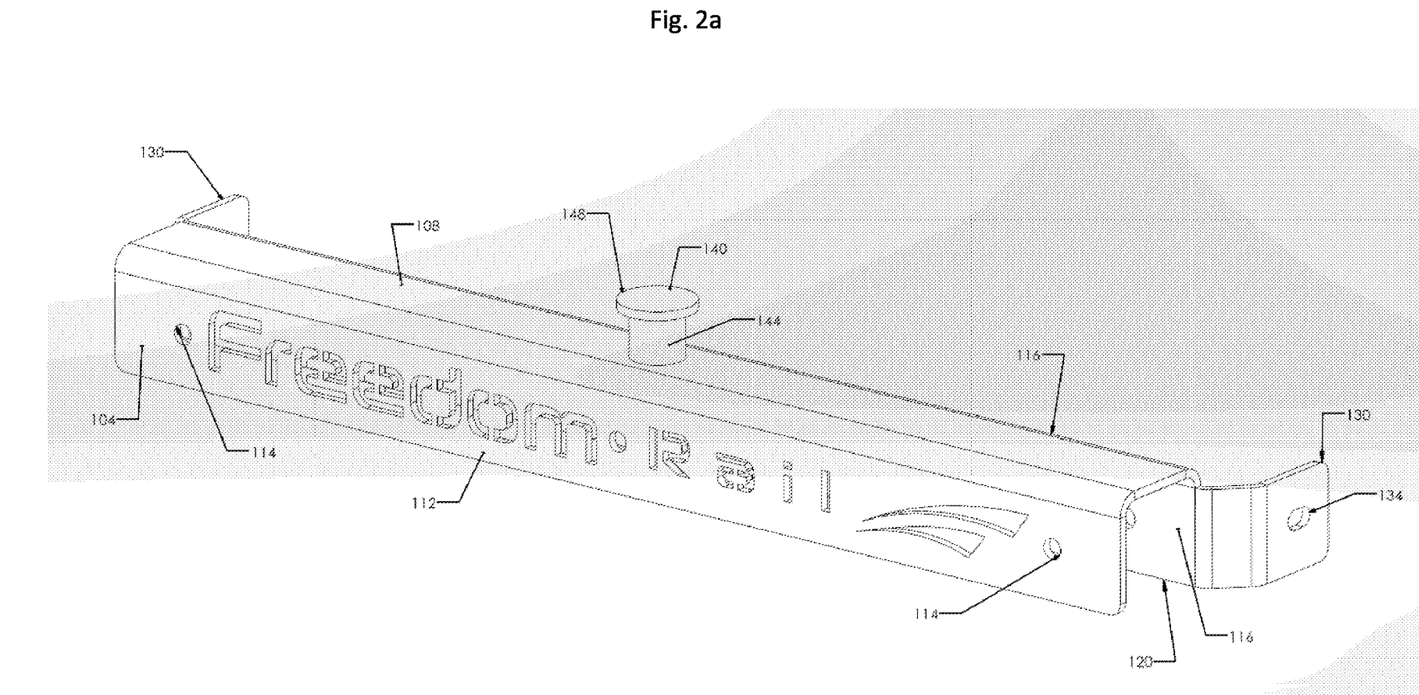
FIG. 2(a) is a top perspective view of a cross member of the tow hitch assembly of FIG. 1.
Figure 2B:
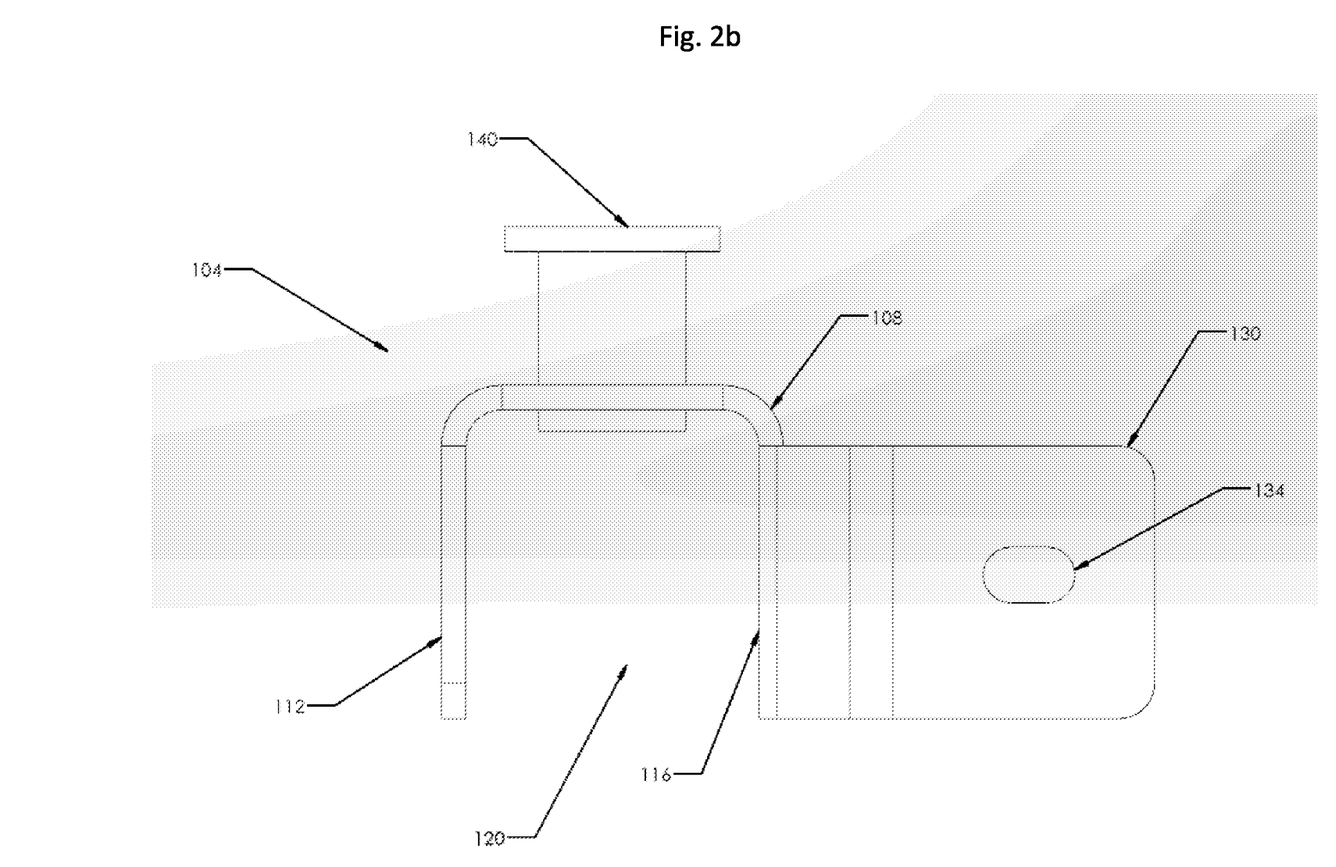
FIG. 2(b) is a side elevational view of the cross member of FIG. 2(a)
Figure 4:
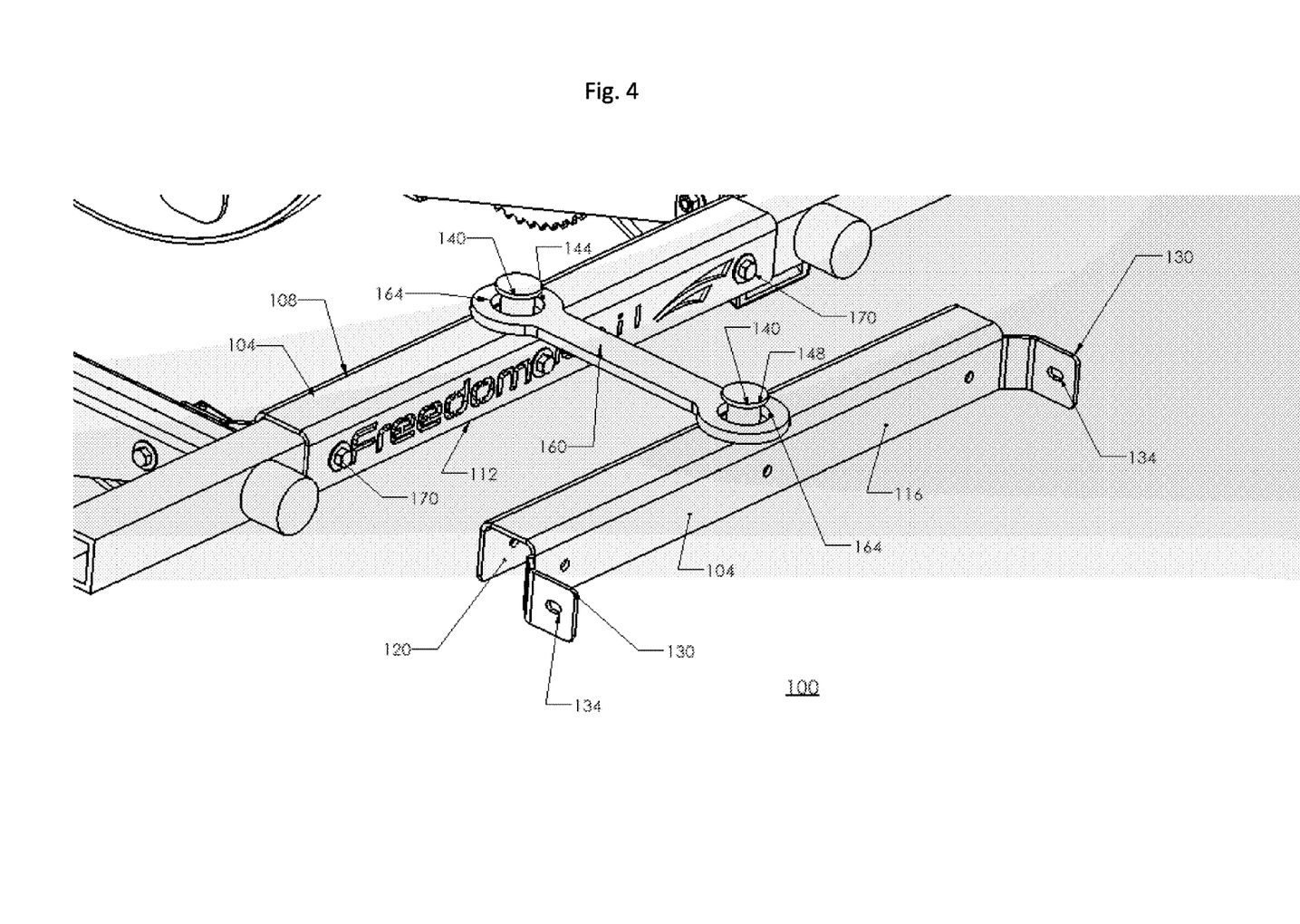
FIG. 4 is an enlarged portion of FIG. 1, depicting the assembled tow hitch assembly of FIGS. 1-3 attached to a bumper of a railbike.

As best shown in FIGS. 2(a) and 4, each cross bar 104 further includes a set of spaced openings 114 disposed along the front wall 112, the openings 114 being aligned to extend through both the front wall 112 and the rear wall 116, as well as through aligned openings (not shown) that are formed in the front bumper 48. According to this specific embodiment, three (3) openings 114 are preferably provided, although this number can be suitably adjusted. One or more openings 134 are also provided in the extending ears 130 to enable attachment to the lateral members of the frame 14, the latter having aligned openings (not shown). Each cross bar 104 further includes a projecting pin 140, which is welded or otherwise secured to the top wall 108, which vertically (upwardly) extends therefrom at approximately the center of the length dimension of the cross bar 104. According to this exemplary embodiment, the projecting pin 140 includes a shank portion 144 and an adjacent head portion 148.

Figure 3:
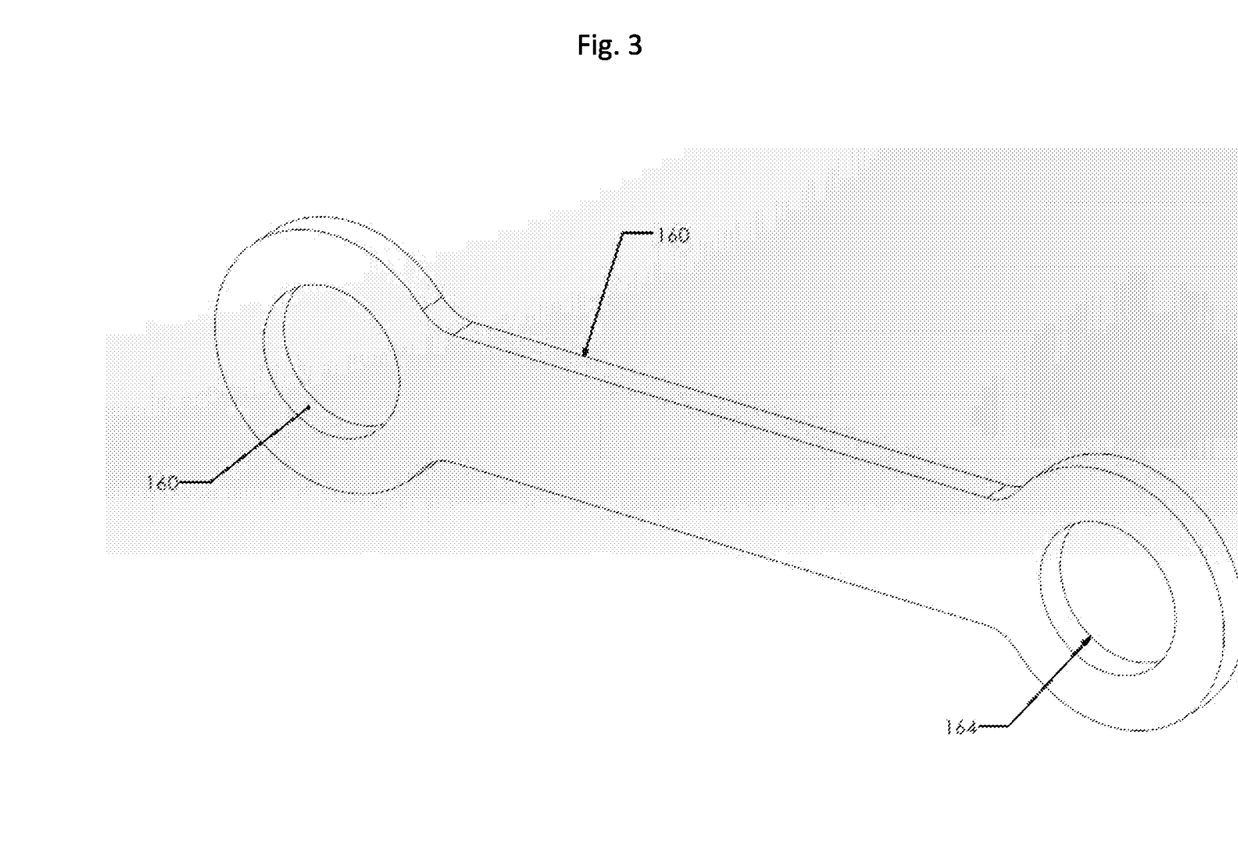
FIG. 3 is a perspective view of a linking member of the tow hitch assembly of FIG. 1.

The tow hitch assembly 100 further includes the linking member 160, which is a unitary planar member having formed openings 164, 168 provided at opposing ends. According to this embodiment, the linking member 160 is made from steel or stainless steel, although other suitable structural materials can be used. The linking member 160 according to the exemplary embodiment is ⅜ inches thick and has an overall length of about 13 inches. The opposing end openings 164, 168 are each sized to engage and fit entirely over the projecting pin 140, including the shank and head portions 144, 148 extending from each of the pair of cross bars 104.

Figure 1:
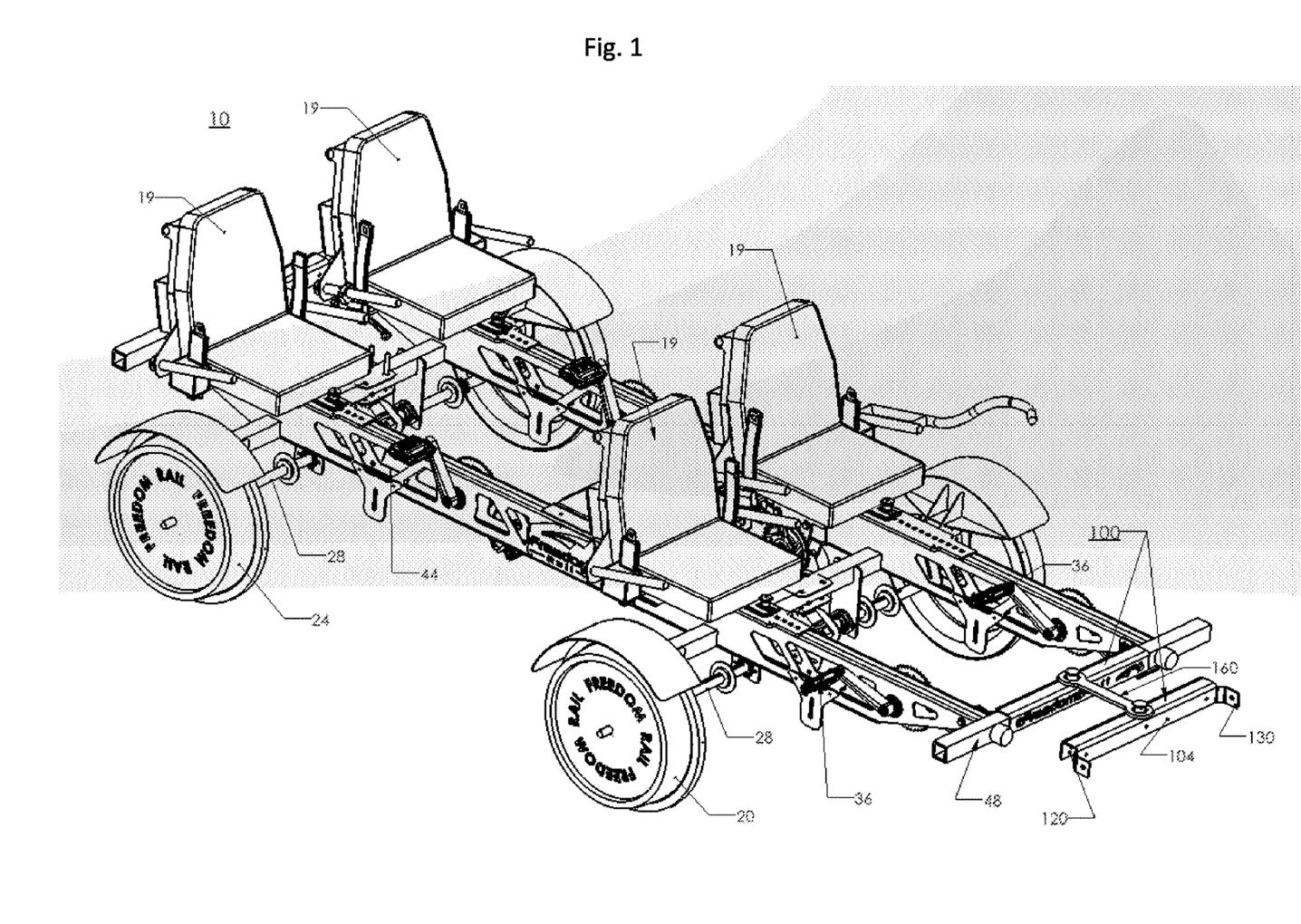
FIG. 1 is a perspective view of a tow hitch assembly attached to a bumper of a railbike and in accordance with aspects of the present invention.
Figure 5:
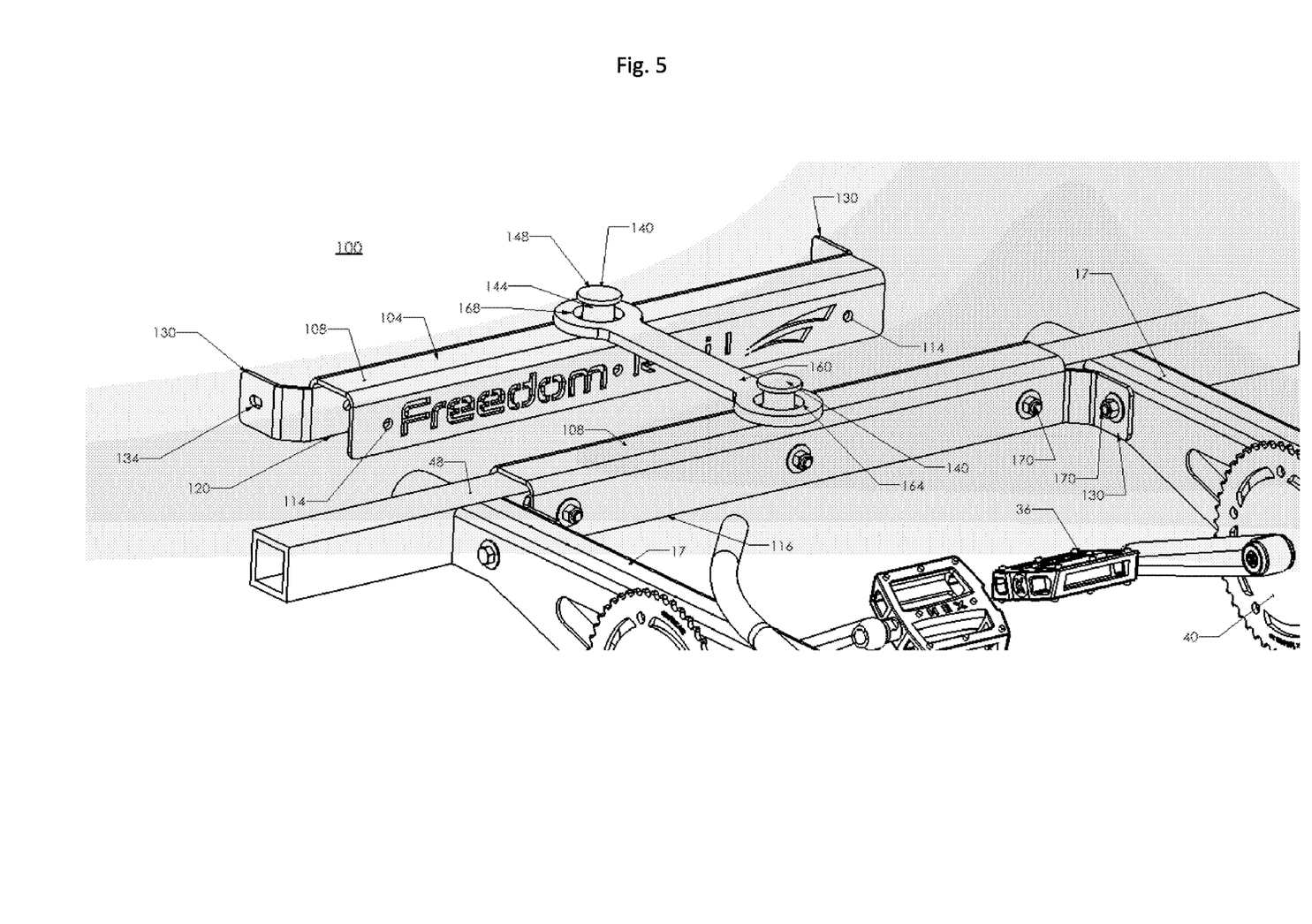
FIG. 5 is a partial rear perspective view of the assembled tow hitch assembly of FIGS. 1-4.

With reference to FIGS. 1, 4 and 5, a fully assembled tow hitch assembly 100 is shown with one of the cross members 104 being attached to the front bumper 48 of the railbike 10. More specifically, the lower U-shaped channel 120 is snugly fitted entirely over the portion of the front bumper 48 between the pair of lateral frame members 17. The linking member 160 is attached to the cross bar 104 with the end opening 160 being placed over the projecting pin 140. In addition, bolts 170 are provided at the spaced openings of the front and rear walls 112, 116 of the cross bar 104 with the rear extending ears 130 being fastened to an interior facing side of each of the lateral frame members 17.

The remaining cross member 104 is similarly attached to the rear bumper of an adjacent railbike (not shown), which is forward of the railbike 10. Similarly, a plurality of railbikes can be connected together using a plurality of the tow hitch assemblies interconnecting the railbikes to one another. The linking member 160 enables a certain degree of misalignment relative to the coupled railbikes, but maintains the necessary interconnection.

To enable towing of at least two or more railbikes, the linking member 160 can be attached to the front bumper 48 of a first railbike 10 and a rear bumper 52 of an adjacent second railbike (not shown) by placing the rear opening of the linking member 160 over the projecting pin 140 of the front bumper 48 of the first railbike 10 and the projecting portion (not shown) of the rear bumper 52 of the second adjacent railbike (not shown). Similar connections can then be made to a plurality or sequential series of railbikes to link them together, for example, for transport between locations. Advantageously, a plurality of railbikes can be towed or otherwise transported all at one time. In one version, the front and rear railbikes of a formed series or convoy of railbikes can include a motor capable of pushing or pulling the plurality of interconnected railbikes. It will also be readily apparent that other types of wheeled vehicles, such as golf carts and go carts, among others, can similarly be interconnected together using a tow hitch assembly made in accordance with the present invention.

PARTS LIST FOR FIGS. 1-5

10 railbike
14 frame or chassis 17 lateral frame members
19 seats
20 front rail wheels
28 rear rail wheels
36 sets of pedals
40 chain drive
44 transmission
48 front bumper
52 rear bumper
100 tow hitch assembly
104 pair of cross bars or pair of cross members
108 top wall
112 front wall
114 spaced openings, cross bar
116 rear wall
120 open lower U-shaped channel
130 extensions or ears
134 openings
140 projecting pin
144 shank portion
148 head portion
160 linking member
164 end opening, linking member
168 end opening, linking member
170 bolts It will be readily apparent that there are other modifications and variations to the herein described embodiment, which is intended to describe an example of the present invention, which is further defined in the following appended claims.

The invention claimed is:

1. A tow hitch assembly for interconnecting two or more wheeled vehicles, each wheeled vehicle having a frame including a front bumper and a rear bumper, the tow hitch assembly comprising:
   a pair of cross members centrally and transversely attachable to opposing ends of a linking member, each cross member having a top wall, a front wall and a rear wall defining an open-ended lower channel configured to be fitted directly over one of the front and rear bumpers of one of the two or more vehicles; and
   the linking member disposed between and coupling the pair of cross members.

2. The tow hitch assembly of claim 1, wherein each cross member further includes a projecting pin outwardly extending from the top wall, the projecting pin being sized for engaging an opening of the linking member.

3. The tow hitch assembly of claim 1, wherein each cross member further includes a pair of end extensions configured for attachment to an axial portion of the frame.

4. The tow hitch assembly of claim 3, wherein each cross member is configured to be fixedly attached to one of the front and rear bumpers of one of the wheeled vehicles, each cross member including one or more mounting holes sized for receiving a fastener.

5. The tow hitch assembly of claim 1, wherein the wheeled vehicles are railbikes.

6. A method for towing two or more wheeled vehicles, the method comprising the steps of:
   attaching a first cross member over one of the front and rear bumpers of one of the two or more wheeled vehicles;
   attaching a second cross member over the other of the front and rear bumpers of an adjacent wheeled vehicle; and
   securing a linking member to the first and second cross members.

7. The method according to claim 6, further comprising the step of securing the cross members to the bumper and the frame of each wheeled vehicle.

8. The method according to claim 6, wherein the securing step comprises placing an end opening of the linking member over a projecting portion of the first cross member and placing an opposite end opening of the linking member over a projecting portion of the second cross member.

9. The method according to claim 6, further comprising the step of securing end protrusions to lateral frame members of the frame.

10. The method according to claim 6, wherein the wheeled vehicles are railbikes.

* * * * *